April 7, 1953     C. W. STEWARD     2,634,357

COLLECTOR RING ASSEMBLY

Filed May 10, 1950     2 SHEETS—SHEET 1

Inventor
Colby Weston Steward
By Wilkinson, Huxley, Byron & Hume
Attorney

April 7, 1953  C. W. STEWARD  2,634,357
COLLECTOR RING ASSEMBLY
Filed May 10, 1950  2 SHEETS—SHEET 2

Inventor
Colby Weston Steward
By
Wilkinson, Huxley, Byron & Hume
Attorney

Patented Apr. 7, 1953

2,634,357

UNITED STATES PATENT OFFICE 2,634,357

COLLECTOR RING ASSEMBLY

Colby Weston Steward, Newton, Iowa, assignor to The Maytag Company, Newton, Iowa, a corporation of Delaware Application May 10, 1950, Serial No. 161,073

9 Claims. (Cl. 219—19)

The invention relates to collector ring assemblies of improved construction for supplying electrical energy to rotatable apparatus, and more particularly to a collector ring assembly which may be rotated about a slightly varying axis.

When supplying electrical energy to rotatable apparatus it is necessary to provide slip rings or the like at some point in order to permit relative movement between the supporting structure and the rotatable member. If the slip rings are mounted on the rotatable member the brushes in contact therewith must be so mounted that they are held relatively stationary with respect thereto. Heretofore it has been necessary to provide rather elaborate means for holding the brushes and slip rings in their desired position so that relative shifting movement or misalignment cannot take place and, under certain conditions, this requires relatively expensive machining and fitting operations. Also, when a third or neutral wire is necessary, such as, for example, when the rotatable member must be grounded, an additional slip ring and brush is required.

With a construction of the proposed type, as will be hereinafter more fully described, it is possible to mount a collector ring assembly on a rotatable member or drum in a relatively simple manner which does not require accurate alignment with respect to the supporting structure and when the rotatable member is normally insulated from ground it is possible to ground the same through the assembly without the use of an additional slip ring. This is accomplished by securing a metallic stub shaft or pin on the approximate axis of rotation of the rotatable member and mounting the collector ring assembly thereon and connecting the pin directly to ground through a flexible holding arm whose lower end is secured to the base.

This holding arm not only provides a means for grounding the rotatable member but in addition the upper end engages the stationary element or portion of the collector ring assembly carrying the brushes to prevent the same from rotating. By making the holding arm flexible it permits the brush holding portion of the assembly to move eccentrically with the slip ring carrying portion should the pin be mounted eccentric with respect to the true axis of rotation of the rotatable member; however, it will prevent the brush holding portion from rotating therewith.

It is therefore an object of the invention to provide means for grounding the rotatable apparatus through a portion of the collector ring assembly.

It is still another object of the invention to provide a collector ring assembly which may be eccentrically mounted with respect to the true axis of rotation of a rotatable member with a flexible member connected thereto to permit slight eccentric displacement but to prevent rotation of one of the elements of the assembly.

It is yet another object of the invention to provide a collector ring assembly which is relatively simple in construction and eliminates the necessity for an additional slip ring when mounted on a rotatable member normally insulated from ground.

It is still another object of the invention to provide a rotatable member supported loosely on a base structure with a collector ring assembly which need not be accurately aligned with either of the elements.

It is another object of the invention to provide a rotatable clothes drying drum normally insulated from and loosely supported on a base structure with a collector ring assembly which need not be accurately aligned with either of the elements and the drum may be grounded through the securing means for the slip ring assembly.

Other objects, features, capabilities and advantages are comprehended by the invention as will later appear and as are inherently possessed thereby.

Referring to the drawings.

Figure 1:
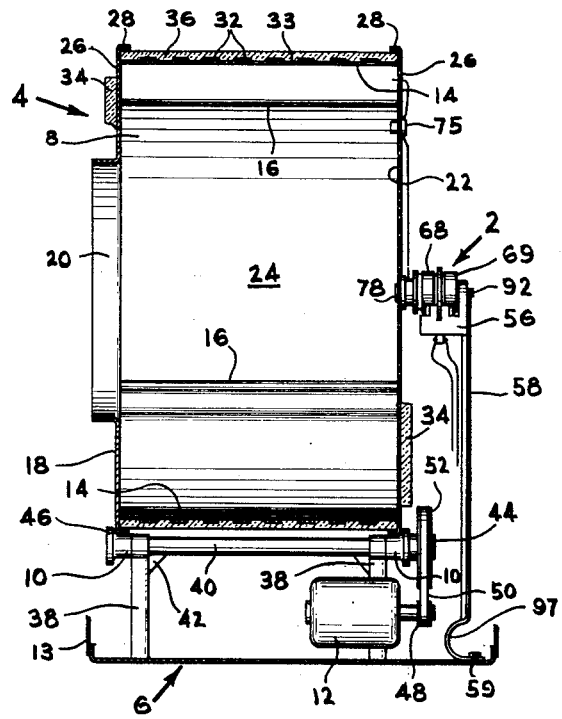
Figure 1 is a partial vertical sectional view of an automatic clothes drier on which the improved collector ring assembly is applied.
Figure 2:
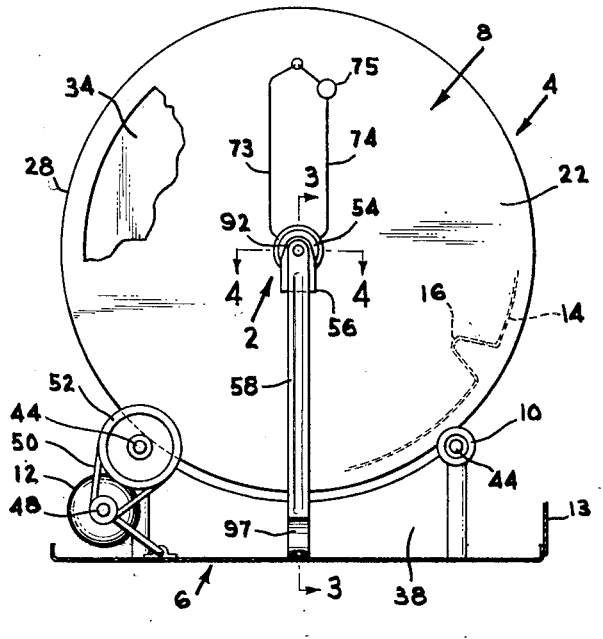
Figure 2 is an end elevational view of the drier shown in Figure 1.
Figure 3:
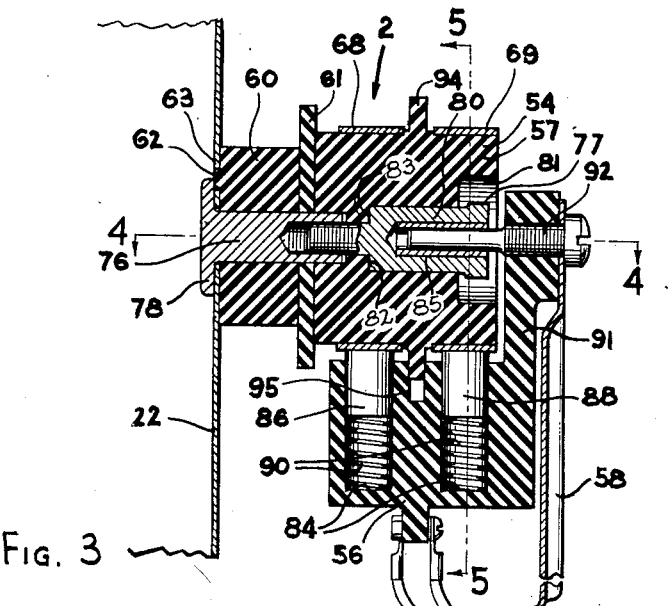
Figure 3 is an enlarged broken vertical sectional view of the collector ring assembly taken along the line 3—3 of Figure 2.
Figure 4:
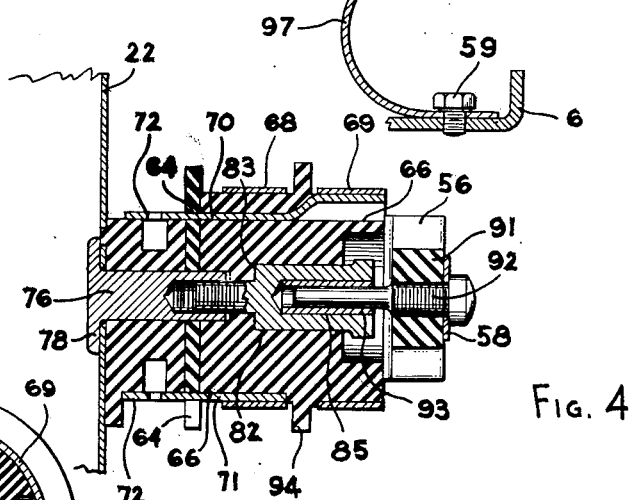
Figure 5:
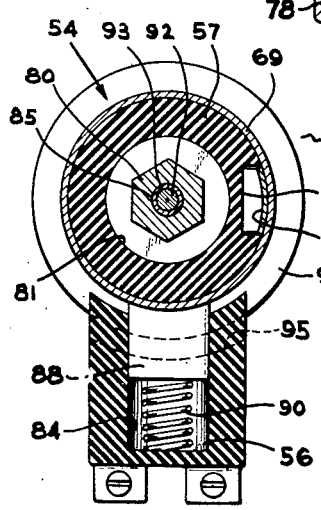

Figure 4 is a horizontal sectional view taken on the line 4—4 of Figures 2 and 3; and, Figure 5 is a transverse vertical sectional view taken on the line 5—5 of Figure 3.

Referring now more in detail to the drawings for one form of apparatus to which a collector ring assembly 2 embodying the features of the present invention may be applied, there is shown a clothes drier 4 having a metallic base structure or frame construction 6 which provides a support for a hollow clothes receiving metallic rotatable member or drum 8 mounted for rotation about a horizontal axis within a cradle formed by four horizontally spaced hard rubber rolls 10, and rotated by means of an electric motor 12, in a manner as will be hereinafter more fully described. The drier further includes control mechanism (not shown) for automatically controlling the operation and duration of the drying cycle. Also, the entire mechanism may be completely enclosed within an outer cabinet 13 to present a pleasing appearance.

The horizontally mounted rotatable metallic drum 8 includes an imperforate cylindrical wall 14, with parallel radially inwardly directed clothes lifting or elevating vanes 16 formed thereon, disposed between a vertical front wall 18, having a single centrally located access opening 20 therein, and a vertical substantially imperforate rear wall 22 spaced in parallel relation with the front wall, all being secured together to form a rigid unitary structure to define a clothes drying chamber 24. Each wall has identical flange portions 26 extending outward to form a pair of inwardly directed flat horizontal cylindrical supporting surfaces or rims 28 adapted to rest on the spaced rubber rollers 10 to provide the sole supporting means for holding the drum 8 in its horizontal plane.

In order to evaporate the moisture in the clothing within the chamber 24 heat must be applied thereto. In this modification the preferred means for heating the chamber is in the form of an electrical heating element 32 formed by a single, flat, long, thin and relatively wide strip of stainless steel or other material having somewhat similar characteristics. This heating element is preferably tightly wound in an open spiral to substantially cover the entire outer periphery of the imperforate cylindrical wall 14, and a thin layer of electrical insulation 33, such as, for example, asbestos or the like, is placed therebetween to prevent electrical contact with the drum. A heating element of this type is adapted to uniformly heat the entire periphery of the drum, which, of course, heats the clothing in the chamber to drive off the moisture or a high percentage thereof and the overall temperature of the entire heating element is reduced considerably; in fact, it may be reduced to a point below that which would normally cause ignition of the clothing should they remain in contact with the drum for any length of time, such as, for example, if the drive motor should fail and the drum stop rotating or for any other reason.

To improve the efficiency of the drier, insulating pads 34 may be attached to the outer surfaces of the front and rear walls, and a layer of thermo-insulation 36 of any suitable type is wrapped and secured about the outer periphery of the heating element 32 to totally enclose the same. Therefore, any lint shaken off of the clothing during the drying operation that may contact the exterior of the drum cannot accumulate on the heating element, thus an additional fire hazard is eliminated.

In order to support the rotatable drum 8 in its horizontal position there are provided a pair of similar, oppositely disposed and upwardly extending parallel webs 38 formed integral with the base structure 6 and preferably positioned adjacent the front and rear walls 18 and 22 of the drum transverse to its horizontal axis. Bridging the upper outer ends of the opposite webs 38 there are mounted a pair of parallel horizontally spaced tubular members 40 disposed parallel with the drum and rigidly secured to the webs 38 by means of angle brackets 42 to provide a relatively simple rigid supporting structure. These tubular members journal horizontal shafts 44 which project outward beyond both ends of the tubular member and on which the rubber supporting rolls 10 are secured in any suitable manner. In addition, each supporting roller has a radial projecting flange 46 to provide a thrust collar adjacent the outer portion of the flanges 26 on both of the headers and are relatively closely spaced thereto in such manner as to limit axial shifting movement of the drum when it is rotated about its horizontal axis.

Means for rotating the drum includes the drive motor 12, having a driving pulley 48 secured thereto, mounted for rotation on an axis parallel to the drum axis and connected by means of a belt 50 to a driven pulley 52 rigidly secured to a projecting end of one of the horizontal supporting shafts 44 adjacent one of the rollers 10. When the motor is energized the drive pulley rotates one of the shafts 44 through the driven pulley 52 to cause the same to rotate. With the weight of the drum insuring proper contact with the driving pair of rubber rollers 10 on the driving shaft the friction between the engaging portion of the rollers and rims 28 rotates the drum about its horizontal axis at a considerable speed reduction, while the opposite shaft carrying its rollers 10 acts as a rolling support.

With a drum and base construction of the above described type it is obvious that the assembly need not be aligned too accurately and close tolerances are not necessary and that the drum may shift or wobble slightly during rotation of the same without affecting the operation of the drier.

Since the heating element 32 is mounted on the outer periphery of the drum, means including a collector ring must be employed for energizing the same. In one illustrated form of the invention, as shown more clearly in Figures 3 to 5, the collector ring assembly 2 is secured on the back portion of the rear wall 22 of the drum 8 and mounted on the approximate axis of rotation of the same. This collector ring assembly comprises a generally cylindrical rotatable element or hub portion 54 of any suitable non-conducting material adapted to be secured on the approximate axis of rotation of the drum 8, and a relatively stationary element or brush holder 56 of any suitable non-conducting material loosely mounted on the rotatable hub but restrained from rotating therewith by means of a flexible metallic holding arm or strap 58 which has its lower end rigidly secured to the base 6 by means of a bolt 59 to form a good electrical bond therewith.

For manufacturing reasons the rotatable hub portion 54 is preferably formed in a plurality of pieces and comprises a cored outer dielectrical cylindrical block 57 and a pair of inner insulating spacers 60 and 61. The innermost spacer 60 has one or more outwardly projecting pins or lugs 62 on its one face adapted to fit in mating openings 63 in the rear wall 22 of the drum to prevent relative movement therebetween. The intermediate spacer 61 is provided with a pair of notches or slots 64 formed in alignment with longitudinally extending slots 66 in the cylindrical block 57. A pair of spaced cylindrical slip rings 68 and 69 are mounted on the outer periphery of the block 57 and electrical straps 70 and 71 have one end connected to the slip rings 68 and 69, respectively. These straps extend from each slip ring along its respective slot in the block 57 through the intermediate spacer whereat they engage the same to prevent axial shifting movement of the slip rings and the innermost ends of the straps provide terminals 72 for conductors 73 and 74 which extend radially outward therefrom along the back of the drum. The conductor 73 passes through an opening in the rear wall 22 of the drum and is directly connected to one end of the heating element 32 while the opposite end of the heating element is connected to the conductor 74 which is connected in series with a fixed temperature responsive thermostat or limit switch 75 secured to the rear wall adjacent the outer periphery of the drum. This thermostat is utilized to de-energize the heating element when the temperature within the drum reaches or tends to exceed a predetermined safe value and is responsive if the air within the drum or the rear wall, either collectively or individually, exceeds a safe value.

In order to hold the rotatable hub 54 in position on the back of the drum, there is provided a combination mounting means or centering device and ground connection 77. In the illustrative example of the invention, such mounting means includes a supporting shaft means comprising a stud or pin 76 and a sleeve bolt or clamping member 80. The stud or pin 76 is provided at one end with an enlarged head 78 disposed in the drying chamber to engage the inner portion of the rear wall 22 of the drum, the same extending outwardly through an opening provided in said rear wall and being further provided with an internally threaded axially extending recess at its other end. This stud or pin may be of any suitable length or type and, as shown, it projects through the spacers 60 and 61 and the internally threaded portion thereof is engaged by the threaded end of the sleeve bolt or clamping means 80 which fits within the core pin 81 in the block. The sleeve bolt 80 is formed intermediate the ends thereof with the annular shoulder 82 and its outer end is provided with an axially extending recess 85. It is obvious that as the bolt 80 is threaded into the stud or pin 76 the shoulder 82 thereof engages shoulder 83 on the core portion of the block, and that the block 57 carrying the slip rings 68 and 69 and spacers 60 and 61 are rigidly secured to the drum and must rotate therewith.

In order to supply electrical energy to the slip rings 68 and 69 the brush holder 56 is provided with a pair of recesses 84 therein adapted to receive a pair of brushes 86 and 88 which are pressed into engagement with the slip rings 68 and 69 by means of springs 90 disposed in the lower portion of the recesses. Suitable electrical conductors may be connected to the brushes in any suitable manner to supply energy to the same. While the springs 90 will maintain the brushes in contact with the slip rings means must be provided to hold the same in their proper radial position. This positioning may be readily accomplished by providing the brush holder 56 with an upstanding arm or extension 91 and tapping the same to receive the threaded shank of a metallic centering or bearing pin 92, which forms a part of the mounting means carried by the drum. This bearing pin has a forwardly projecting tubular cylindrical section adapted to enter and engage the recessed portion of the sleeve bolt 80 and the sleeve bolt may be provided with a bearing insert 93 to permit relative sliding movement between the pin and sleeve.

With a construction of this type it is obvious that the relative radial position between the brush holder and hub is maintained constant at all times and that the springs acting through the brushes against the slip rings will always insure that the pin remains in contact with the sleeve bolt. Since the brush holder must be limited against axial shifting movement, the cylindrical block 57 is provided with a radially outwardly projecting annular shoulder 94 adapted to fit loosely within a slot 95 formed in the brush holder 56 between the brushes. While the brush holder 56 is limited against axial shifting movement by the shoulder 94 engaging the slot 95 and is held in its proper radial position by means of the bearing pin 92, rotation of the brush holder 56 with the slip rings is prevented by means of the flexible strap 58 which is secured, in this modification, to the brush holder 56 by means of the bearing pin 92. Since the lower end of the flexible holding strap 58 is rigidly secured to the base 6 by means of the bolt 59 it is obvious that the brush holder must remain relatively stationary with respect to the rotatable hub 54.

When a collector ring assembly of this type is mounted on rotatable apparatus which may not have a fixed bearing or bearings, and for manufacturing reasons it may be difficult to locate the assembly on the true axis of rotation of the rotatable member, the assembly may wobble with respect to the true axis. By utilizing this collector ring assembly and providing the flexible holding strap 58 with a loop 97 at the lower portion of its length the assembly may be disposed eccentric to the true axis taken with respect to the base. Also should the front and back walls be shifted slightly during the manufacturing operation the assembly would wobble, even if mounted on the true axis of rotation of the rear wall. In this manner, as the hub 54 is being rotated eccentric to the true axis of the rotatable member or with respect to the base, the flexible strap 58 will permit vertical, horizontal and axial movement of the assembly but will prevent the brush holder 56 from rotating with the hub 54, and due to the fact the holding arm is made flexible by the loop 97 the brushes and slip rings are not stressed under any normal operating conditions.

As previously described, when the rotatable apparatus is insulated from ground as by means of the rubber rollers 10, or other similar means, it is, in most instances, necessary to ground the same. The grounding of the rotatable member is accomplished, in this embodiment, by means of the metallic stud 76, sleeve bolt 80, bearing pin 92 and holding strap 58 whose lower end is grounded to the base by the bolt 59. This connection insures a direct ground without the necessity of adding an additional slip ring and brush to the assembly and without adding to the overall cost of the same.

From the foregoing it can be seen that a collector ring assembly has been provided which is relatively simple in construction and which need not be accurately aligned with respect to the true axis of rotation of the rotatable member and to a stationary supporting base to hold the brushes in contact with the slip rings. Also, a collector ring assembly has been provided which utilizes the support for the cylindrical insulating hub as a neutral or ground conductor for a rotatable member which is adapted to rotate on an insulated support and utilizes the brush holder holding strap to complete the ground connection.

It is to be understood that the particular mounting means which includes the stud, sleeve bolt and pin may be modified or the construction so changed as to eliminate one or more of the elements without departing from the spirit of the invention.

While I have herein described and upon the drawings shown an illustrated embodiment of the invention, it is to be understood that the invention is not limited thereto, but may comprehend other constructions, arrangement of parts, details and features without departing from the spirit of the invention.

It is claimed:

1. In a clothes drier, the combination of a base, a metallic drum supported by and insulated from said base and mounted for rotation about its horizontal axis, heating means carried by said drum, a collector ring assembly for said heating means including a pair of members of non-conducting material for supporting co-operating collector ring and brush means, means having electrical conducting relation with said drum and carried thereby approximately on its horizontal axis for supporting said pair of members with one of said members being rotatable with said drum, and means including flexible means operatively connected to said base and to the other of said members to hold the same against rotation, said flexible means being operatively connected to said means having electrical conducting relation with said drum to provide a ground connection for said drum and having an offset portion intermediate its ends to accommodate any eccentric rotation of said drum.

2. In combination with a rotatable member, a collector ring assembly comprising a pair of members of non-conducting material for supporting co-operating collector ring and brush means, means having electrical conducting relation with said rotatable member for mounting one of said second-named members approximately at the axis of rotation of said rotatable member, flexible means having an electrical connection to said last-named means to provide a ground connection for said rotatable member for supporting the other of said second-named members to hold the same against rotation and having an offset portion intermediate its ends to maintain the co-operative relation of said collector ring and brush means irrespective of eccentric movement of said one of said second-named members, and means for securing said flexible means to the other of said second-named members.

3. The combination according to claim 2, in which the last-named means is provided with an element journaled in the mounting means.

4. In a clothes drier, the combination of a base, a metallic drum supported by and insulated from said base and mounted for rotation about its horizontal axis, means for rotating said drum, heating means carried by said drum, metallic mounting means carried by said drum on its horizontal axis, a collector ring assembly comprising a pair of members mounted on said mounting means, and means including a flexible strap having one end secured to said base and the other end secured to one of said members to prevent the same from rotating and having an offset portion intermediate said ends to accommodate eccentric rotation of said drum, said mounting means and said strap being engaged to provide a ground connection for said rotatable drum.

5. In a collector ring assembly, the combination of a base, a rotatable member supported by and insulated from said base member, mounting means secured to said rotatable member adjacent its axis of rotation, a hub carrying slip rings mounted on said means to rotate therewith, a brush holder disposed adjacent said hub and positioned by said mounting means, and a flexible holding strap having one end fastened to said brush holder and its other end secured to said base to prevent rotation of said brush holder and having an offset portion intermediate said ends to accommodate eccentric rotation of said drum, said strap having an electrical connection with said mounting means to provide a ground connection for said rotatable member.

6. Means for supplying electrical energy to a rotatable member supported by and insulated from a base member and mounted for rotation, comprising a collector ring assembly having a rotatable portion and a stationary portion, mounting means having a connection with said rotatable member adjacent its axis of rotation, one of said portions carrying slip rings and the other of said portions carrying brushes cooperating with said slip rings, means for rotating said rotatable portion with said rotatable member, a pin engaging said mounting means for holding said stationary portion adjacent said rotatable portion, and means including a flexible holding strap having one end secured to said base and the other end engaging said stationary portion to prevent rotation of the same, said strap being electrically connected to said rotatable member through said mounting means to provide a ground connection for said rotatable member.

7. In combination, a metallic base construction, a plurality of insulating rollers carried by said base, a metallic drum supported for rotation about its horizontal axis on said insulating rollers, electrical heating means mounted on said drum to rotate therewith, a stud projecting outwardly from said drum at its approximate axis of rotation, a generally cylindrical hub carrying slip rings thereon mounted on said stud for rotation therewith, a hollow sleeve bolt cooperating with said stud to clamp said hub to said drum, a holder for carrying brushes disposed adjacent said slip rings, a pin extending through said holder and journalled in said sleeve bolt for holding said holder in its proper radial position, a flange on said hub for engaging a portion of said holder to limit axial movement of the same, and a flexible metallic strap having one end secured to said base and the other end secured to said holder by said pin to prevent rotation of said holder and to provide an electrical ground connection for said drum.

8. In combination, a metallic supporting base construction, a metallic drum mounted for rotation about its horizontal axis on said base and electrically insulated therefrom, an electrical heating element carried by said drum to rotate therewith, supporting shaft means secured to said drum and projecting outwardly therefrom at its approximate axis of rotation, a substantially cylindrical hub carrying slip rings thereon, and mounted on said supporting shaft means, a holder for carrying brushes disposed adjacent said slip rings, a pin extending through a portion of said holder and journalled by said supporting shaft to prevent radial movement with respect to said hub, means on said hub for limiting axial movement of said holder, and a flexible metallic strap secured to said base and to said holder by said pin to prevent rotation of said holder and to provide an electrical ground connection for said drum.

9. In combination, a metallic base construction, a plurality of insulating rollers carried by said base, a metallic drum supported for rotation on said insulating rollers, electrical heating means mounted on said drum to rotate therewith, a stub shaft projecting outwardly from said drum at its approximate axis of rotation, a collector ring assembly comprising a rotatable element and a stationary element carrying slip rings on one of said elements and brushes on the other of said elements mounted on said stub shaft, a hollow sleeve bolt for engaging said stub shaft to clamp said rotatable element to said drum to rotate therewith, a pin carried by said stationary element journalled in said hollow bolt to permit relative rotary motion therebetween, means carried by one of said elements for engaging the other of said elements to limit relative axial movement therebetween, and a flexible metallic strap secured to said base and to said stationary element through said pin to prevent rotation of the same and to provide an electrical ground connection for said drum.

COLBY WESTON STEWARD.

REFERENCES CITED

The following references are of record in the file of this patent:

UNITED STATES PATENTS

| Number | Name | Date |
|---|---|---|
| 1,170,388 | Anschutz-Kaempfe | Feb. 1, 1916 |
| 1,334,876 | Seymour | Mar. 23, 1920 |
| 1,381,243 | Seymour | June 14, 1921 |
| 1,468,419 | Seymour | Sept. 18, 1923 |
| 1,496,356 | Noonan | June 3, 1924 |
| 1,629,942 | Zeun | May 24, 1927 |
| 1,629,943 | Zeun | May 24, 1927 |
| 1,761,832 | Johansson | June 3, 1930 |
| 2,204,325 | Staley | June 11, 1940 |
| 2,354,100 | Bowen | July 18, 1944 |
| 2,583,747 | Potter | Jan. 29, 1952 |